United States Patent [19]
Mahler et al.

[11] Patent Number: 5,403,064
[45] Date of Patent: Apr. 4, 1995

[54] ATTACHMENT PARTS SUCH AS HAND GRIPS, SUN VISORS OR THE LIKE FOR THE INTERIOR OF A VEHICLE

[75] Inventors: Gert Mahler, Radevormwald; Christof Kauka, Kevelaer; Hans H. Mieglitz, Monheim, all of Germany

[73] Assignee: Gebr. Happich GmbH, Wuppertal, Germany

[21] Appl. No.: 96,040

[22] Filed: Jul. 22, 1993

[30] Foreign Application Priority Data

Jul. 22, 1992 [DE] Germany ............ 42 24 148.0

[51] Int. Cl.$^6$ ............ B60R 13/02; B60R 11/00
[52] U.S. Cl. .................. 296/214; 296/97.9; 105/354; 24/609; 411/344; 16/112; 16/DIG. 12
[58] Field of Search ........ 296/39.1, 214, 97.9; 105/354; 24/609, 611; 411/344, 345, 342; 52/698; 16/112, 126, DIG. 16, DIG. 24

[56] References Cited

U.S. PATENT DOCUMENTS

| | | | |
|---|---|---|---|
| 3,477,104 | 11/1969 | Lewis | 24/611 |
| 4,530,615 | 7/1985 | Katsuura et al. | 16/112 X |
| 4,981,323 | 1/1991 | Dowd et al. | 296/214 |

FOREIGN PATENT DOCUMENTS

| | | |
|---|---|---|
| 2502999 | 7/1976 | Germany . |
| 2531368 | 2/1977 | Germany . |
| 2623602 | 12/1977 | Germany . |
| 3018060 | 11/1981 | Germany . |
| 3021552 | 1/1982 | Germany . |
| 3245927 | 6/1984 | Germany . |
| 3820334 | 12/1989 | Germany . |
| 708894 | 5/1954 | United Kingdom . |

*Primary Examiner*—Dennis H. Pedder
*Attorney, Agent, or Firm*—Ostrolenk, Faber, Gerb & Soffen

[57] ABSTRACT

An attachment part for the interior of a vehicle, such as a hand grip (31) or sun visor (33, 37), has a receiving housing (4) adapted to grip over a bearing bracket (6) which is to be fastened to an attachment wall of the vehicle. The attachment part is swingably pivoted on the bearing bracket. In order to obtain a simplified mounting, the bearing bracket (6) is formed with a detent nose (9) which is adapted for passing through an opening (22) in the attachment wall (21) and for engaging behind the edge of the opening. Pivoted to the bearing bracket (6) is a detent lever (12) having an axis of rotation (13) directed parallel to the pivot pin (7). The detent lever (12) is pivoted by a free end thereof to the bearing bracket (6), while at having at its other end a pair of curved arms (15, 16), the first of which (15) can be acted on by the receiving housing (4) in order to swing the second (16) by a swinging movement of the attachment part into a detent position which engages behind the edge of the opening (22) in the attachment wall (21) on the side facing away from the detent nose (9). The first arm (15) is formed with a detent projection (23) which is engagingly supported by a stop (24) on the bearing bracket (6) in the detent position of the arm (15).

11 Claims, 5 Drawing Sheets

ATTACHMENT PARTS SUCH AS HAND GRIPS, SUN VISORS OR THE LIKE FOR THE INTERIOR OF A VEHICLE

BACKGROUND OF THE INVENTION

1. Field of the Invention

The invention relates to an attachment part such as a hand grip, sun visor or the like, for the interior of a vehicle. Briefly stated, the attachment part preferably has at least one receiving housing for being gripped by a bearing bracket which is to be attached to an attachment wall. The attachment part is pivoted on the bracket in order to bring it from a position of non-use into a position of use, or vice versa. For this purpose a pivot pin is provided, which passes through holes in the receiving housing and bearing bracket.

2. Background Art

Federal Republic of Germany OS 32 45 927 describes an attachment part for the interior of vehicles which is developed in the form of a hand grip. The hand grip has receiving housings which grip over bearing brackets which are fastened on an attachment wall. The receiving housings are swingably pivoted to the bearing brackets, for which purpose pivot pins are provided which pass through holes in each receiving housing and bearing bracket. In the case of this known hand grip, the bearing brackets are provided with holes for the passage of attachment screws which are screwed into the attachment wall. The necessity of attaching hand grips and other attachment parts to the interior of a vehicle by means of screws results in a relatively high installation cost, since the installation process is labor-intensive and therefore, such process is no longer considered suitable for modern industry. Screw attachments furthermore have the disadvantage that they can loosen with the passage of time.

Detent and clip attachments for attachment parts in the interior of vehicles have, to be sure, become known (see, for instance, Federal Republic of Germany OS 30 21 552), but they have the disadvantage of being substantially more difficult to remove.

SUMMARY OF THE INVENTION

Therefore, the main object of the present invention is to avoid the aforementioned problems, and in particular, to provide an attachment part of the aforementioned type which, while being comparatively simple and inexpensive to manufacture, can be rapidly and easily mounted and dismounted, and can be held absolutely reliably in mounted condition.

This object is achieved in accordance with one aspect of the invention, by forming the bearing bracket with a detent nose which passes through an opening in the attachment wall and engages behind the edge of the opening. The bearing bracket, in turn, bears a detent lever pivoted to it and has its axis of rotation directed parallel to a pivot pin. The detent lever is preferably formed in the manner of a stock anchor with a free end pivoted to the bearing bracket, and having at the other end of the anchor a pair of curved arms, the first of which can be acted on by the receiving housing, in order to swing the second one by a swinging movement of the attachment part into a detent position which engages behind the edge of the opening in the attachment wall on the side facing away from the detent nose. The first arm is structured with a detent projection which is supported by a stop on the bearing bracket in the detent position of the arm.

The principal advantage of the measures just described is that, in order to attach the attachment part, it is merely necessary to hang the detent nose on the lower edge of the opening in the attachment wall and then to swing the attachment part. The attachment process is therefore limited to the installation steps of hanging and swinging. In the hanging step, the attachment part can be placed in the position which it will subsequently have in use, and can then be brought into the position of non-use by swinging it. The swinging motion is transmitted directly to the detent lever which swings around its axis of rotation, and its second arm, hereinafter referred to as the detent arm, engages behind the edge of the opening in the attachment wall. The fastening and clamping achieved by the measures in accordance with the invention is also permanent, particularly for the reason that the detent projection on the first arm passes beyond the dead center line between the pivot pins upon the swinging movement of the detent lever, before it comes against the stop of the bearing bracket.

One advantageous aspect of the invention provides that the attachment part is premounted on a shaped part and can be fastened together with the latter to the attachment wall. As the shaped part, any desired covering part can be used, such as a receiving shell for the flush storing of the attachment part in its position of non-use. A receiving shell is particularly advantageous when the attachment part is a hand grip, which is aesthetically pleasing when received in the receiving shell.

According to another particularly advantageous aspect of the invention, the shaped part may be developed as a decorative and/or supporting frame and adapted to be arranged in the region of the edge of the roof of the vehicle. In this case, it is recommended, in order to compensate for construction tolerances, that the decorative and/or supporting frame be formed of at least two individual parts.

The invention thus not only makes possible a rapid and easy attachment of an attachment part, but at the same time also facilitates the attachment of a shaped part, such as a receiving shell, or a decorative and/or supporting frame, on an attachment wall. The attachment wall may be the roof frame of a vehicle body.

The invention can be further developed in that the bearing bracket is a component of and forms one piece with the shaped part as shown in FIG. 12. If, therefore, a plastic injection molding is used for the shaped part, as is preferred, a bearing bracket, or several brackets, can be developed integral therewith without any additional expense.

On the other hand, as a further development of the invention the bearing bracket can also be developed as a separate, independent part which is to be mounted on the attachment part and has a support pin directed away from the detent nose for engagement into a recess in the shaped part. The support pin will serve to facilitate the mounting, and particularly the premounting, of the attachment part on the shaped member, and to permit a temporary, secure, loss-proof connection between the attachment part and the shaped part. The separate development of the bearing bracket is always advantageous when manufacturing tolerances are to be bridged over.

The invention can furthermore also be carried out by premounting several attachment parts on the shaped part, which is developed as a decorative supporting frame, the frame being provided with a ceiling. Further attachment elements such as air ducts, wiring, rear-window sun visors, hand grips, lights, side window shades, ventilation nozzles, garment hooks, eyeglass holders, windshield sun visors and the like, are being adapted to be fastened in the shaped part on the attachment walls at least by the fastening system of the hand grips.

The invention thus makes it possible to develop a modular ceiling system with attachment parts which can be rapidly and easily mounted. The attachment parts, particularly hand grips but also sun visors or the like, are in this connection premounted on the decorative or supporting frame in such a manner that they are all ready for mounting and can be jointly locked by a swinging motion. Automatic means such as robots can be used for causing the attachment parts to move with such a joint swinging motion.

BRIEF DESCRIPTION OF THE DRAWINGS

Other aspects, features, and advantages of the invention will be understood from the following explanation of embodiments thereof, with reference to the accompanying drawings, in which.

DETAILED DESCRIPTION OF THE DRAWINGS

Figure 1:
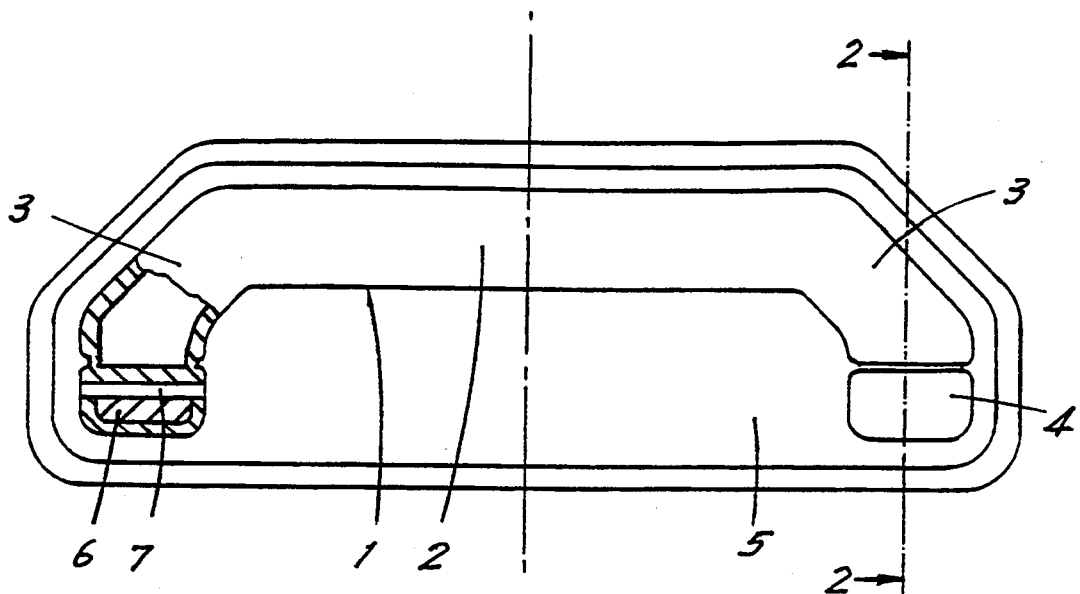
FIG. 1 shows an attachment part in the form of a hand grip.
Figure 12:
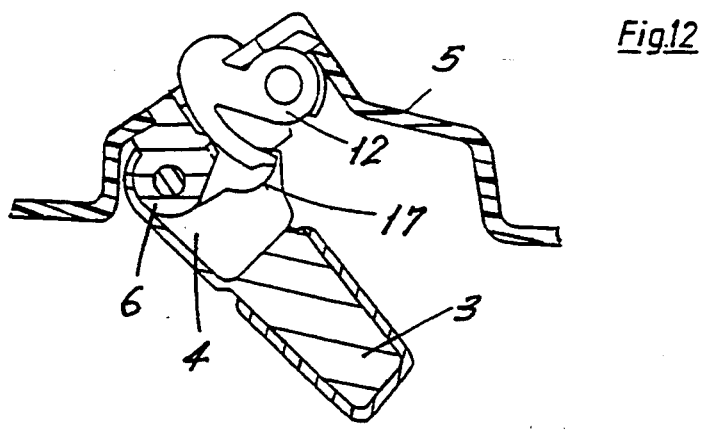
FIG. 12 is a sectional view showing the embodiment featuring an integral bearing bracket and shaped part.

The attachment part shown in FIG. 1 is a hand grip with a yoke-shaped grip body 1 which has a web 2 and two arms 3. Each of the ends of the arms 3 passes into a receiving housing 4. The hand grip is arranged in a shaped receiving shell 5 which is adapted to be fastened within a vehicle in the region of transition between the roof and the side wall.

Figure 2:
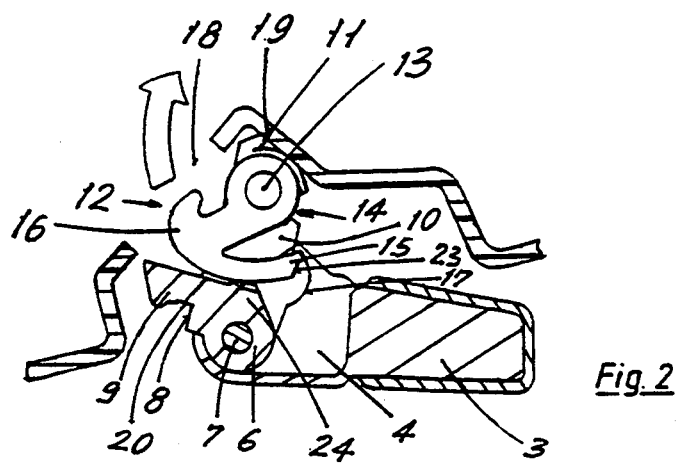
FIGS. 2 to 9 are sectional views taken along the line 2—2 in FIG. 1.

FIG. 2 is a section through the hand grip taken along the line 2—2 in FIG. 1. FIG. 2 shows that an open end of the receiving housing 4 extends over a bearing bracket 6 and that the receiving housing 4 is pivoted to the bearing bracket 6 with the use of a pivot pin 7. The pivoting of the hand grip on the bearing bracket 6 makes it possible to swing the grip body 1 from a position of non-use resting closely against an attachment wall into a position of use protruding from the attachment wall, and vice versa. In this connection, it is possible to arrange a spring device (not shown) between the receiving housing 4 and the bearing bracket 6, which urges the hand grip into the position of non-use and returns it into the position of non-use. It is also advisable to provide, between the receiving housing 4 and the bearing bracket 6, a blocking device (also not shown) which can hold the grip body 1 in the swung-out position of use during the attachment mounting process, described below, until that process has been concluded.

As seen in FIG. 2, the bearing bracket 6 has a detent nose 9 which protrudes over a resting surface 8 and has a bearing bracket extension 10 protruding laterally out of the receiving housing 4. Adjoining the bearing bracket extension 10 is a support pin 11 which is directed perpendicular to the detent nose 9. On the bearing bracket extension 10, which here has the form of a two-tined fork, is pivoted a detent lever 12, having an axis of rotation 13 directed parallel to the pivot pin 7. The axis of rotation 13 can comprise a pivot pin, or journal pins formed on the detent lever 12, which can be inserted through a slot-shaped opening 14 into an undercut bearing hole in the bearing bracket extension 10.

The detent lever 12 is developed in the manner of a stock anchor and pivoted by the free end of the stock to the bearing bracket 6 or the bearing bracket extension 10. On the other end of the stock there are seated two curved arms, the first of which is referred to as the pressure arm 15 and the second as the detent arm 16. The pressure arm 15 has a free end lying against a curved wall 17 which is formed in the receiving housing 4.

In the example shown in FIGS. 1 to 9, it is assumed that the attachment part, which here is in the form of a hand grip, is to be premounted on a shaped receiving shell 5 and is to be fastened together with the shaped part to an attachment wall, generally a body wall of a vehicle.

Figure 3:
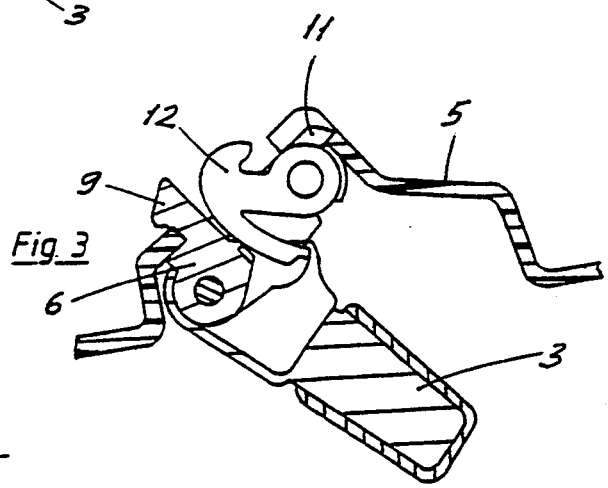

FIGS. 2 and 3 show the premounting steps. As shown, the receiving shell 5 has an opening 18 for the passage of the detent nose 9 and the detent lever 12, as well as a recess 19 for the support pin 11. FIG. 2 shows that first of all the support pin 11 is moved into the recess 19 (see arrow A), whereupon, as shown in FIG. 3, the detent nose 9 is moved or clipped over the edge of the opening 18 facing away from the support pin 11. The edge of the opening is then seated in a receiving depression 20 against the resting surface 8 in the detent nose 9.

FIG. 2 thus shows the start and FIG. 3 the end of the premounting process, in which an attachment part 10 (here a hand grip) is to be connected in a secure, loss-proof manner with a shaped part (here a receiving shell) to form a unit ready for installation.

The premounting steps would change if bearing brackets 6 were formed directly on the receiving shell 5, as could easily be done by plastic injection molding. In such case, the premounting would be limited to inserting the pivot pins 7 and clipping on the detent lever 12.

Figure 4:
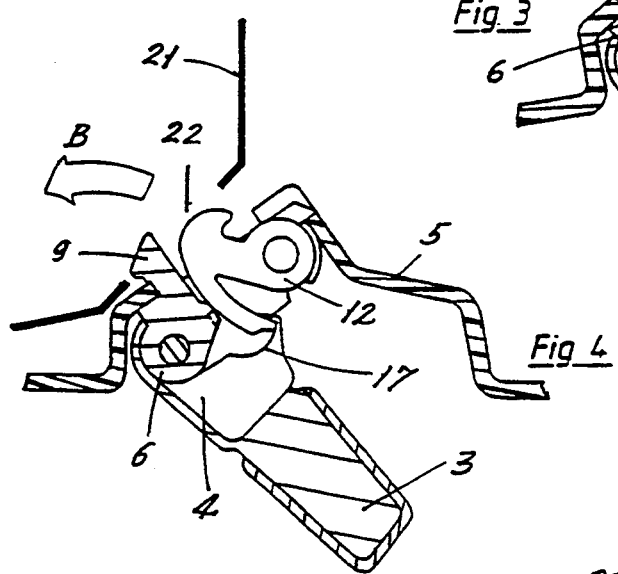
Figure 5:
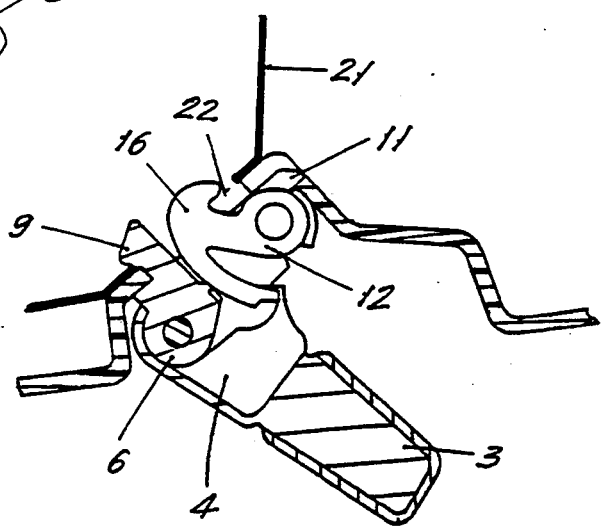
Figure 6:
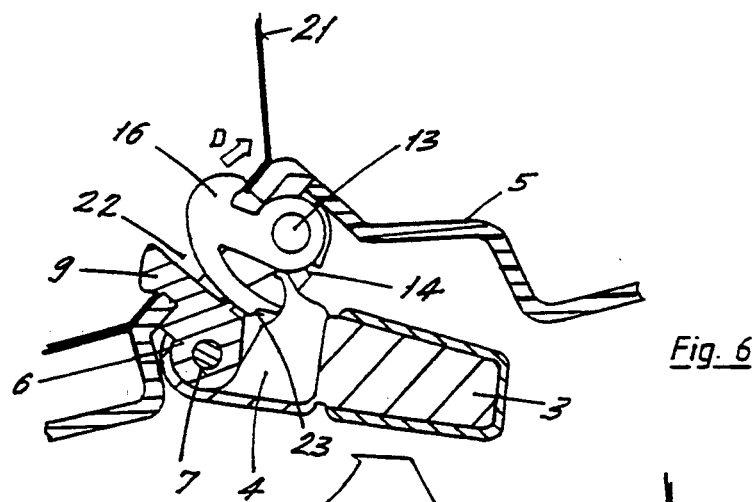
Figure 7:
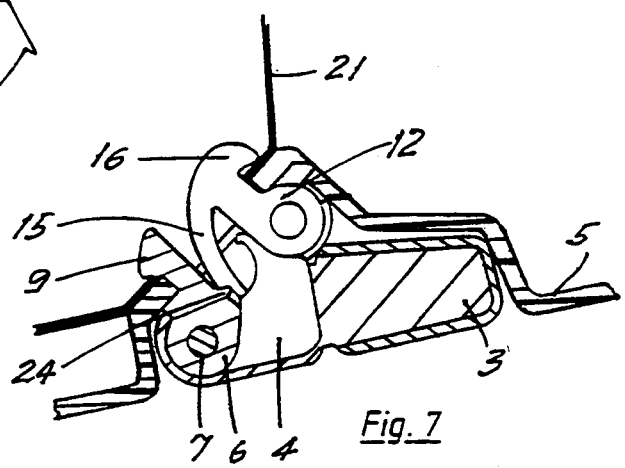
Figure 8:
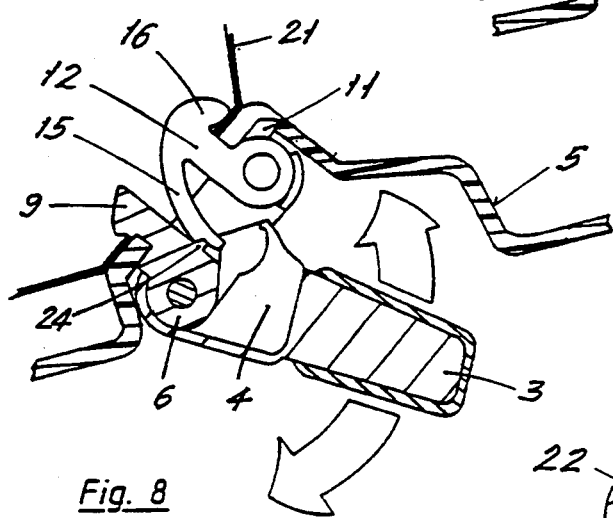

FIG. 4 shows the process of attaching the unit comprising the attachment part and shaped part to an attachment wall 21, which may be a roof member of the body of a vehicle. In this connection, following the direction of the arrow B, the detent nose 9 is hung over the lower edge of an opening 22 in the attachment wall 21. There, as shown in FIG. 5, the receiving shell 5 rests against the attachment wall 21. FIG. 6 shows the final fastening step, in which the grip body 1 is swung out of the position of use into the position of non-use. Upon swinging the arm 3 in the direction of the arrow C, the detent lever 12 is swung, corresponding to the direction of the arrow D, through the wall 17 in the receiving housing 4 which wall acts on the free end of the pressure arm 15. As a result of the swinging movement, the detent arm 16 is locked with tension behind the edge of the opening 22 which faces away from the detent nose 9. The locking is secured by a detent projection 23 formed on the free end of the pressure arm 15. In the detent position, the detent projection 23 engages a stop 24 on the bearing bracket 6. This engagement is achieved, upon the swinging movement of the detent lever 12, when the detent projection 23 passes beyond the dead center line between the pivot pin 7 and the axis of rotation 13. FIG. 7 shows the above-mentioned elements when completely fastened, and FIG. 8 shows how the grip body 1 can be used.

Figure 9:
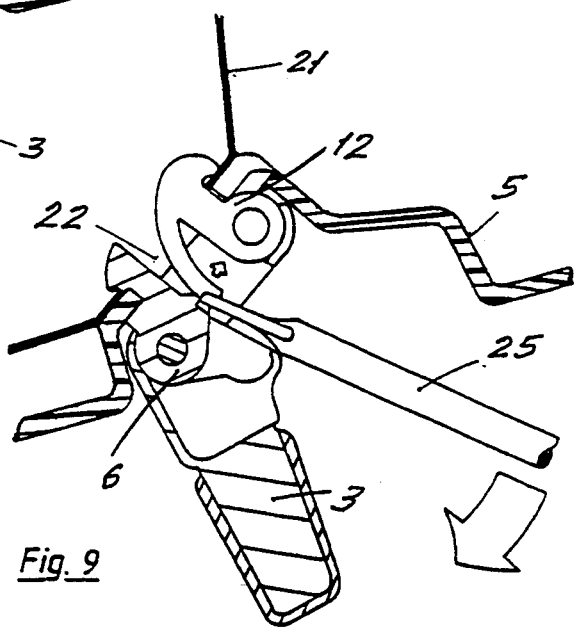

The possibility of detachment is shown in FIG. 9, the pressure arm 15 being lifted off from the stop 24 by a screwdriver 25.

Figure 10:
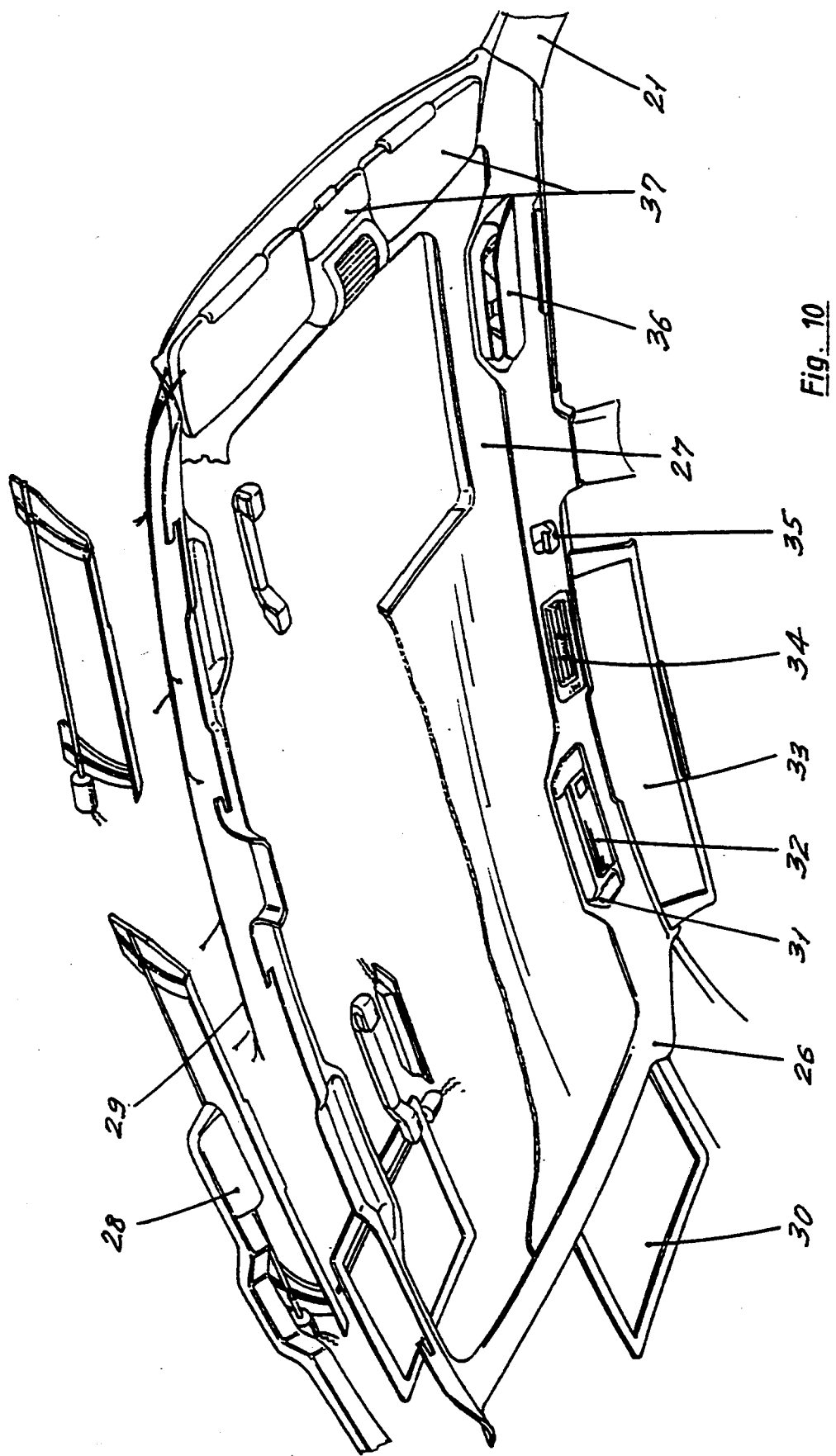
FIG. 10 shows several attachment parts of different types integrated into a ceiling system.

FIG. 10 shows an embodiment of the invention in which a plurality of attachment parts are arranged on a shaped part, which in this case is a decorative supporting frame 26. The decorative supporting frame includes a peripheral frame 26 which may also be formed of individual parts in order to bridge over tolerances. The frame 26 is provided with a ceiling 27 and further attachment parts. In the embodiment shown, air ducts 28, wiring 29, a rear window sun visor 30, hand grips 31, lights 37, side-window sun visors 33, ventilation nozzles 34, garment hooks 35, eyeglass compartments 36, and windshield sun visors 37 are provided as attachment parts. It is not necessary to provide all the abovementioned attachment parts in each case. However, it is important that the decorative supporting frame 26 can be held fast on the attachment walls 21 by the attachment system of the hand grips 31 and/or the other attachment parts which have been described in detail above.

Figure 11:
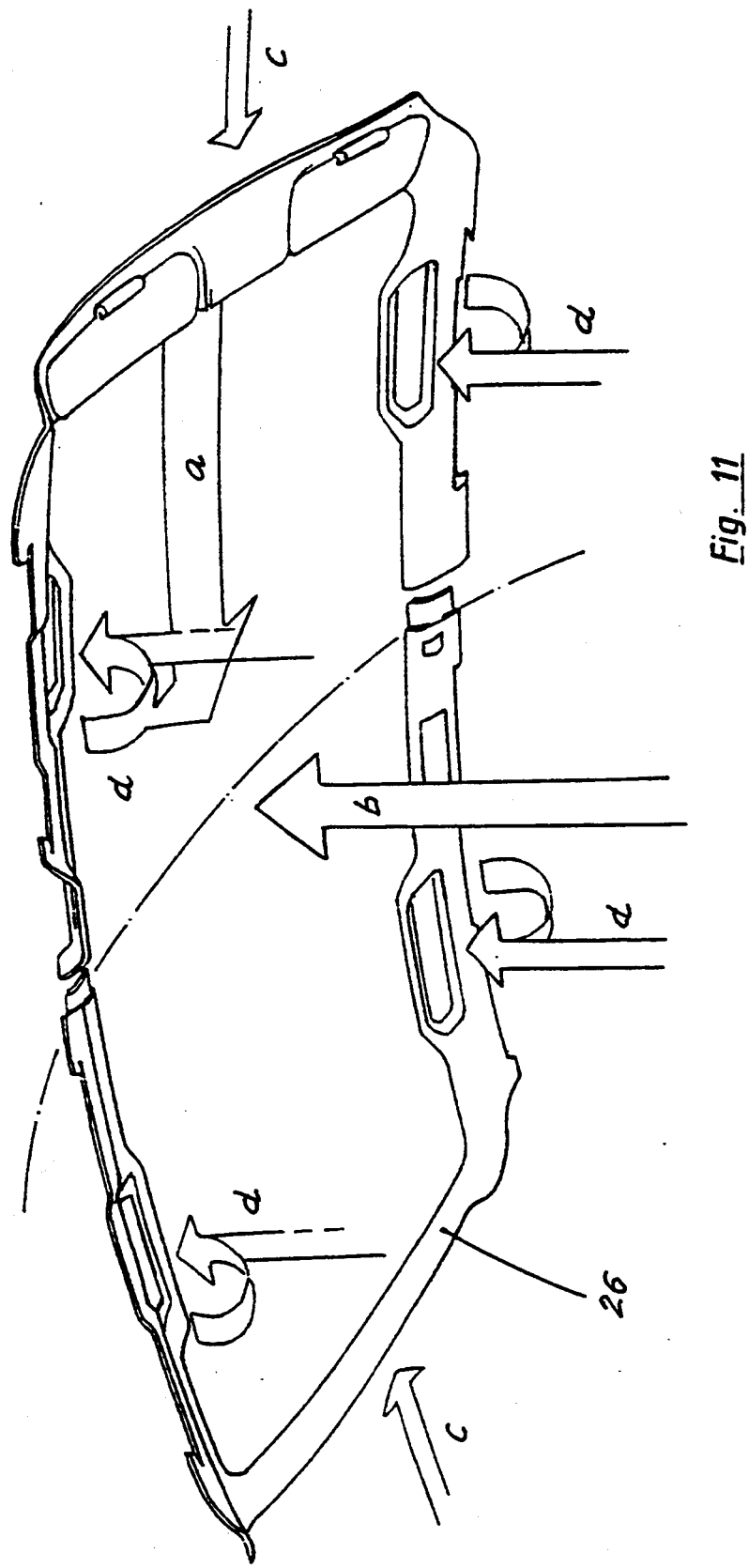
FIG. 11 shows a mounting sequence for the system shown in FIG. 10.

The process of mounting the shaped-body structural unit shown in FIG. 10 can be effected in steps a) to d) with the use of a handling apparatus such as is shown diagrammatically in FIG. 11. This process comprises the following steps:
  a) introduction of the shaped-body structural unit through the windshield,
  b) lifting of the shaped-body structural unit until it rests against the roof/roof frame,
  c) engagement of the detent noses by displacement of the frame 26, as described above, and
  d) pressing the grip bodies and locking the detent lever, also as described above.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An attachment part, for being attached to an attachment wall in the interior of a vehicle, comprising in combination:
  at least one receiving housing for gripping over a bearing bracket which is disposed for being fastened to the attachment wall, the receiving housing being pivoted swingably on the bearing bracket for movement between a position of non-use and a position of use, the receiving housing being pivoted via a pivot pin which passes through holes in the receiving housing and bearing bracket;
  the bearing bracket having a detent nose which is disposed for passing through an opening in the attachment wall and for engaging behind the edge of the opening;
  the bearing bracket pivotally supporting a detent lever with an axis of rotation directed parallel to the pivot pin;
  the detent lever having two ends and being pivoted at a first end thereof to the bearing bracket, and at a second end thereof having a pair of curved arms, a first arm being in position for being acted on by the receiving housing in order to swing the second arm by a swinging movement of the receiving housing into a detent position, in which it engages behind the edge of the opening in the attachment wall at a portion thereof facing away from the detent nose; and
  the first arm being formed with a detent projection which, in the detent position of the first arm, engages a stop on the bearing bracket.

2. An attachment part according to claim 1, further comprising a shaped part, and means on the shaped part permitting the attachment part to be premounted on the shaped part and to be fastened to the attachment wall together with the shaped part.

3. An attachment part according to claim 2, wherein the shaped part comprises a receiving shell which is shaped and sized for storing the attachment part in the position of non-use thereof.

4. An attachment part according to claim 2, wherein the shaped part comprises a supporting frame which is shaped and sized for being arranged in the region of the roof of the vehicle.

5. An attachment part according to claim 4, wherein the supporting frame includes at least two parts.

6. An attachment part according to claim 2, wherein the bearing bracket is integrally formed in one piece with the shaped part.

7. An attachment part according to claim 2, wherein the bearing bracket is separable and independent from the shaped part and has a support pin directed away from the detent nose for engagement into the shaped part.

8. An attachment part according to claim 2, wherein the shaped part comprises a supporting frame which includes a ceiling, and the supporting frame receiving a plurality of attachment parts including a hand grip premounted thereon, the shaped part being adapted to be fastened to the attachment wall of the vehicle by the hand grip.

9. An attachment part according to claim 8, wherein said plurality of attachment parts which can be received by said supporting frame further comprises an attachment part selected from the group consisting of air ducts, wiring, a rear-window sun visor, lights, side-window sun visors, ventilator nozzles, garment hooks, eyeglass compartments, and windshield sun visors.

10. An attachment part according to claim 3, wherein the shaped part comprises a supporting frame which includes a ceiling, and the supporting frame has means for receiving a plurality of attachment parts including a hand grip premounted thereon, the shaped part being adapted to be fastened to the attachment wall of the vehicle by the hand grip.

11. An attachment part according to claim 4, wherein the shaped part comprises a supporting frame which includes a ceiling, and the supporting frame has means for receiving a plurality of attachment parts including a hand grip premounted thereon, the shaped part being adapted to be fastened to the attachment wall of the vehicle by the hand grip.

* * * * *